United States Patent [19]

Sakimoto et al.

[11] 4,140,606
[45] Feb. 20, 1979

[54] PROCESS FOR PREPARING A POLYMERIZABLE (METH) ACRYLATE OLIGOMER

[75] Inventors: Seiichiro Sakimoto, Chigasaki; Haruo Yoshida, Yokohama, both of Japan

[73] Assignee: Showa Denko K.K., Tokyo, Japan

[21] Appl. No.: 830,890

[22] Filed: Sep. 6, 1977

Related U.S. Application Data

[63] Continuation of Ser. No. 663,116, Mar. 2, 1976, abandoned.

[30] Foreign Application Priority Data

Mar. 3, 1975 [JP] Japan .................................. 50-25037

[51] Int. Cl.$^2$ .......................... C08L 63/00; C08F 2/46
[52] U.S. Cl. .......................... 204/159.22; 204/159.19; 260/836; 260/837 R; 526/273; 526/318; 526/320
[58] Field of Search .............................. 260/836, 837; 204/159.19, 159.22, 159.23; 526/273, 318, 320

[56] References Cited

U.S. PATENT DOCUMENTS

| | | | |
|---|---|---|---|
| 3,408,422 | 10/1968 | May | 260/837 |
| 3,426,063 | 2/1969 | Gros | 260/989 |
| 3,676,524 | 7/1972 | Takiyama | 260/836 |
| 3,683,045 | 8/1972 | Baldwin | 260/837 R |
| 3,808,114 | 4/1974 | Tsuchihara | 260/836 |
| 3,816,278 | 6/1974 | Watt | 260/836 |

FOREIGN PATENT DOCUMENTS

1123244 8/1968 United Kingdom.

OTHER PUBLICATIONS

Wako Pure Chemical Industries, Stable Unsaturated Polyesters Compositions, Chemical Abstracts vol. 82, No. 17953D, (1975) (Corresponds to Japan Kokai 74 59,892).
Toa Gosei Chemical Industry, Preventing Popcorn Polymerization of Acrylate or Methacrylate Esters; Chemical Abstracts, vol. 82, No. 40,734XK, (1975) (Corresponds to Japan Kokai 74 125,315).

*Primary Examiner*—Paul Lieberman
*Attorney, Agent, or Firm*—Fitzpatrick, Cella, Harper & Scinto

[57] ABSTRACT

A process for preparing a polymerizable (meth) acrylate oligomer which comprises reacting an epoxide with a carboxylic acid (or anhydride thereof), at least one of said epoxide and carboxylic acid compounds containing an unsaturated alicyclic dicarboxyl group and the other containing an acryloyl group, in the presence of a metal nitrite or N-nitroso-hydroxylamine derivative. The polymerizable (meth) acrylate oligomer containing an acryloyl and an unsaturated alicyclic dicarboxyl group in the molecule is employed in coatings, adhesives, castings and the like.

11 Claims, No Drawings

PROCESS FOR PREPARING A POLYMERIZABLE (METH) ACRYLATE OLIGOMER

This is a continuation of application Ser. No. 663,116, filed Mar. 2, 1976, now abandoned.

BACKGROUND OF THE INVENTION

The present invention relates to a process for preparing a polymerizable (meth) acrylate oligomer. More particularly, the invention relates to a new process for preparing a polymerizable (meth) acrylate oligomer containing an acryloyl group and an unsaturated alicyclic dicarboxyl group in the molecule.

Various types of polymerizable acrylates have been known and used as a heat-, photo- or electron-curable resins in the preparation of coatings, adhesives, reinforced plastics and the like. For example, an epoxy acrylate has been obtained by reacting a polyglycidylether of a polyhydric phenol having more than one epoxy group per molecule with an acrylic acid (see U.S. Pat. Nos. 2,824,851, 3,179,623, 3,377,406, 3,432,478 and 3,317,465). Also, the acrylate which is obtained by reacting a polyglycidylester of a polybasic acid with an acrylic acid has been disclosed in U.S. Pat. No. 3,808,114.

Recently, it has been found that it is possible to obtain a useful polymerizable (meth) acrylate oligomer containing an acryloyl and an unsaturated alicyclic dicarboxyl group in the molecule by reacting an epoxide with a carboxylic acid, wherein at least one of said compounds contains an unsaturated alicyclic dicarboxyl group and the other one contains an acryloyl group. The oligomer excels in providing a tack-free surface in air in a cured state, compared to conventional resins such as unsaturated polyesters and vinyl ester resins (e.g. epoxy acrylates).

As a result, when the oligomer is used in coatings, the coating obtained from the oligomer provides not only a tack-free surface but also provides excellent adhesion to a substrate after curing.

However, since the oligomer contains in close proximity both a highly oxidizable unsaturated alicyclic nucleus which readily forms a hydroperoxide and a highly polymerizable acryloyl group, gelation (crosslinking) is almost completed in the period of the reaction under well known conditions. Gelation takes place readily in the synthesis of an oligomer in which a carboxyl group of the unsaturated alicyclic dicarboxyl group compound and a carboxyl group of the acryloyl group compound combine to form an ester-bond with a polyhydric alcohol having 2 to 4 carbon atoms.

SUMMARY OF THE INVENTION

Attempts have been made to obtain a solvent soluble oligomer having no gel from the above-mentioned oligomer. It now has been discovered that the presence of a metal nitrite or a N-nitroso-hydroxylamine as an inhibitor will permit the reaction to proceed smoothly without gelation. This discovery is discussed in detail hereinafter.

The object of the present invention is, therefore, to provide a new process for preparing the polymerizable (meth) acrylate oligomer.

Another object of the invention is to provide a solvent soluble oligomer which can be used in solution dissolved in an organic solvent or monomer.

Other objects of the invention will be apparent from the following detailed description thereof.

For the purpose of the invention, the terms "acrylate, acrylic and acryloyl" include methacrylate, methacrylic and methacryloyl, respectively.

The oligomer which can be obtained by the process of the present invention comprises a polymerizable acrylate containing the acryloyl and unsaturated alicyclic dicarboxyl groups in the molecule. A carboxyl group of the acryloyl group compound and a carboxyl group of the dicarboxyl group compound combine to form an ester-bond with a polyhydric alcohol having 2 to 4 carbon atoms. The oligomer can be obtained by the ring-opening reaction of an epoxide and a carboxylic acid, at least one of said epoxide and carboxylic acid compounds containing an unsaturated alicyclic dicarboxyl group and the other containing an acryloyl group. Typically, the oligomer can be obtained by reacting: (A) a glycidyl-(meth) acrylate with an unsaturated alicyclic dicarboxylic acid, or anhydride thereof, (B) a diglycidyl unsaturated alicyclic dicarboxylate with acrylic acid or (C) an epoxide with a half ester formed by reacting an unsaturated alicyclic dicarboxylic acid or anhydride thereof with an acrylate having at least one hydroxyl group. A key feature of the present invention is reacting the constituents in the presence of a metal nitrite or N-nitroso-hydroxylamine derivative inhibitor.

DESCRIPTION OF PREFERRED EMBODIMENTS

The unsaturated alicyclic dicarboxylic acid or anhydride thereof used in the reaction (A) can be prepared by subjecting an α, β-unsaturated dicarboxylic acid or anhydride thereof and a conjugated diene to the Diels-Alder reaction set forth in "Organic Reaction" by R. Adams et al, pages 14 to 59, published by John Wiley & Sons Inc., 1949.

The α, β-unsaturated dicarboxylic acid or anhydride thereof used the Diels-Alder reaction may have 4 to 10 carbon atoms in the molecule. Typical examples are maleic acid and maleic anhydride and derivatives thereof, such as a diester of maleic acid, methylmaleic anhydride, methyl maleate, dimethyl maleic anhydride and dimethyl maleate.

Examples of the diene include butadiene, isoprene and butadiene compounds such as 1,2-dimethyl-1,3-butadiene; cyclopentadiene and derivatives thereof; α-terpinene and derivatives thereof; furan and derivatives thereof; and thiophene and derivatives thereof; and cyclopentadiene and derivatives thereof.

The addition reaction between the α, β-unsaturated dicarboxylic acid and the conjugated diene takes place readily by heating without the need of a particular catalyst. However, the addition reaction can be promoted if desired by using a conventional catalyst such as trichloroacetic acid, trimethylamine, α-naphthoquinone or dimethyl aniline.

The unsaturated alicyclic dicarboxylic acid may be expressed by the following general formula:

And the anhydride of said acid may be indicated by the following general formula:

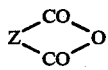
(II)

The term Z of the above general formula (I) or (II) representing the unsaturated alicyclic dicarboxylic acid or anhydride thereof may be further shown by the following formula (III) or (IV):

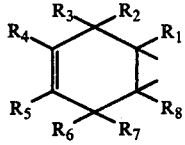
(III)

or

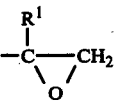
(IV)

Throughout the above general formulas (III) or (IV), $R_1$ to $R_8$ may be the same or different atoms or groups included in the group consisting of a hydrogen, halogen atom, an alkyl alkoxy radical having 1 to 4 carbon atoms, and X is a group expressed by any of the following formulae:

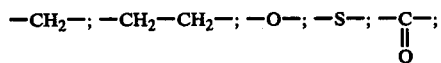

and

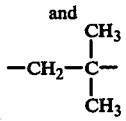

Typical examples of the unsaturated alicyclic dicarboxylic acid and anhydride thereof, whose chemical structures may be expressed by the aforesaid formula (III) are tetrahydrophthalic anhydride, tetrahydrophthalic acid; methyltetrahydrophthalic anhydride; methyltetrahydropthalic acid; 1-methyl-2,3,6-trihydrophthalic anhydride; 1-methyl-2,3,6-trihydrophthalic acid; 1,2-dimethyl-3,6-dihydrophthalic anhydride; 1,2-dimethyl-3,6-dihydrophthalic acid; 4,5-dimethyltetrahydrophthalic anhydride; 4,5-dimethyltetrahydrophthalic acid; 4,5-dimethoxytetrahydrophthalic anhydride; 1,2-dichloro-3,6-dihydrophthalic anhydride; 1,2-dichloro-3,6-dihydrophthalic acid; 1,2-dihydro-3,6-dichlorophthalic anhydride; 1,2-dihydro-3,6-dichlorophthalic acid; 1,2-dihydro-3,6-diphenylphthalic anhydride; and 1,2-dihydro-3,6-diphenylphthalic acid.

Typical examples of the unsaturated alicyclic dicarboxylic acid and anhydride thereof, whose chemical structure may be indicated by the aforesaid general formula (IV) are 3,6-endomethylene-1,2,3,6-tetrahydrophthalic anhydride; 3,6-endomethylene-1,2,3,6-tetrahydrophthalic acid; 3,6-endomethylene-1,2-dimethyl-3,6-dihydrophthalic anhydride; 3,6-endomethylene-1,2-dimethyl-3,6-dihydrophthalic acid; α-terpinene-maleic anhydride adduct; furan-maleic anhydride adduct; β-hydroxy-furanmaleic anhydride adduct; isobenzofuranmaleic anhydride adduct; thiophene-maleic anhydride adduct; and 2,5-dimethyl-3,4-diphenyl cyclopentadiene-maleic anhydride adduct; cyclopentadiene-maleic anhydride adduct; cyclopentadienone-maleic anhydride adduct.

The diglycidyl unsaturated alicyclic dicarboxylate used in the reaction (B) is obtained by the reaction of epichlorohydrin or methyl epichlorohydrin with an unsaturated alicyclic dicarboxylic acid and may be expressed by the following general formula:

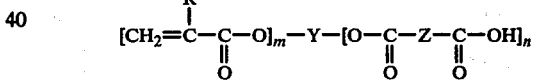

wherein, $R^1$ is a hydrogen atom or a methyl radical, Z is the same as that shown by the above-mentioned formula (III) or (IV) and p is an integer number from 0 to 10.

Typical examples of diglycidyl unsaturated alicyclic dicarboxylates are diglycidyl tetrahydrophthalate, diglycidyl methyltetrahydrophthalate, diglycidyl 1-methyl-2,3,6-trihydrophthalate, diglycidyl 1,2-dimethyl-3,6-dihydrophthalate, diglycidyl 4,5-dimethyl-tetrahydrophthalate, diglycidyl 3,6-endomethylene-1,2,3,6-tetrahydrophthalate and diglycidyl 3,6-endomethylene-1,2-dimethyl-3,6-dihydrophthalate.

The half ester formed by reacting an unsaturated alicyclic dicarboxylic acid or anhydride thereof and an acrylate having at least one hydroxyl group used in the reaction (C) may be expressed by the following general formula:

$$[CH_2=\overset{R}{\underset{|}{C}}-\underset{\parallel}{\underset{O}{C}}-O]_m-Y-[O-\underset{\parallel}{\underset{O}{C}}-Z-\underset{\parallel}{\underset{O}{C}}-OH]_n$$

wherein, R is a hydrogen atom or a methyl radical, Y is an alkylene, alkylene oxyalkylene or alkylene amino alkylene radical, having 2 to 4 carbon atoms, each alkylene optionally substituted by (i) a hydrocarbon radical having up to 8 carbon atoms selected from the group consisting of alkyl, alkenyl, cycloalkyl, cycloalkenyl, aryl and aralkyl radical, (ii) a halogen atom, (iii) a hydroxyl, (iv) amino group, (v) an ether or (vi) said hydrocarbon radical substituted by a halogen atom, a hydroxyl, amino group or ether; m and n are respectively an integer from 1 to 3; and Z is the same as that shown by above-mentioned formula (III) or (IV).

The half ester can be obtained by reacting an acrylate having at least one hydroxyl group with an unsaturated alicyclic dicarboxylic acid or anhydride thereof.

Typical examples of the acrylate having at least one hydroxyl group are ethylene glycol monoacrylate, ethylene glycol monomethacrylate, propylene glycol monoacrylate, propylene glycol monomethacrylate, glycerine monoacrylate, glycerine monomethacrylate, glycerine diacrylate, glycerine dimethyacrylate, pentaerythritol monoacrylate, pentaerythritol monomethacrylate, pentaerythritol diacrylate, pentaerythritol dimethacrylate, pentaerythritol triacrylate and pentaerythritol trimethacrylate.

Furthermore, the half ester also can be obtained by directly reacting a polyhydric alcohol and an acrylic acid with the unsaturated alicyclic dicarboxylic acid or anhydride thereof.

Typical polyhydric alcohols are ethylene glycol, 1,2-propylene glycol, 1,3-propylene glycol, diethylene glycol 1,4-butylene glycol, 1,3-butylene glycol, dimethylolethane, 2-chloromethyl-ethyleneglycol, 2-chloro-1,3-propyleneglycol, 2-bromomethyl-ethyleneglycol, 2-bromo-1,3-propyleneglycol, 2-chloromethyl-1,3-propyleneglycol, 2-bromomethyl-1,3-propyleneglycol, 4-chloro-1,2-butyleneglycol, 4-bromo-1,2-butyleneglycol, 1,2-butyleneglycol, glycerine monophenylether, 2-vinylethyleneglycol, glycerine monotolylether, phenyl ethyleneglycol, glycerine monoallylether, an N-substituted diethanolamine or dipropanolamine substituted by an alkyl, cycloalkyl, alkenyl, cycloalkenyl or aryl radical having at most 8 carbon atoms, 1,2-cyclohexanediolglycerine monobutylether and dicyclopentadiene dihydrate.

Furthermore, the epoxides used as another component in the reaction (C) are typically exemplified by a substituted or an unsubstituted glycidyl ether, a substituted or an unsubstituted glycidyl ester, an alicyclic epoxide, or other epoxide resins such as triglycidyl isocyanurate or glycidyl hydantoin resin.

Typical examples of the glycidyl ether which is prepared by reacting an epoxy compound with a dihydroxy or polyhydroxy compound are ethylene glycol diglycidyl ether; diethylene glycol diglycidyl ether; butanediol diglycidyl ether; 1,6-hexanediol diglycidyl ether; neopentyl glycol diglycidyl ether; and a reaction product of epichlorohydrin or methyl epichlorohydrin with bisphenol A, [2,2-bis (4-hydroxyphenyl) propane], or bisphenol F [bis (4-hydroxyphenyl) methane].

Typical examples of the glycidyl ester are obtained by reacting an epoxy compound such as an epichlorohydrin and methyl epichlorohydrin with a dicarboxylic acid such as an adipic acid, isophthalic acid, phthalic acid, methyltetrahydrophthalic acid and hexahydrophthalic acid or a polycarboxylic acid or anhydride thereof, and also includes a copolymer of a glycidyl (meth) acrylate.

Typical examples of the alicyclic epoxide are as follows: epoxidized oils, vinyl cyclohexene dioxide, dicyclopentadiene dioxide and 3,4-epoxy-6-methylcyclohexylmethyl-3,4-epoxy-6-methylcyclohexane carboxylate. Another epoxide is triglycidyl isocyanurate or glycidyl hydantoin resin.

Ring-opening reactions (A) to (C) used in the process of the invention are a kind of esterification as shown by the following equation:

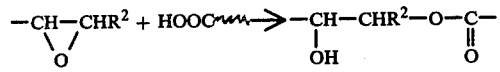

wherein $R^2$ can be hydrogen, alkyl or a divalent alkylene radical which is joined with the other carbon atom of the epoxy moiety to form an alicyclic epoxide. The proportion of the carboxyl group to 1 mole of the epoxide is generally 0.6 to 1.8 moles, preferably 0.8 to 1.2 moles. If the proportion is less than 0.6:1, then unreacted epoxides remain in the reaction system upon completion of the reaction. Conversely, if the proportion exceeds 1.8:1, then unreacted carboxylic acid remains in the reaction system upon completion of the reaction. In both cases, the unreacted compounds should be removed by any means. Even if it becomes unnecessary to remove the unreacted compounds under these circumstances, the physical properties of the cured material obtained from the polymerizable oligomer are deteriorated.

The thus obtained acrylate oligomer preferably has a molecular weight of 200 to 2,000 per acryloyl group to provide a material having excellent curability in air and exhibiting excellent adhesion to a substrate.

The metal nitrite used in the process of the invention as an inhibitor may be a metal nitrite of an alkali or alkali earth metal. Typical examples are lithium nitrite, sodium nitrite, potassium nitrite, magnesium nitrite, calcium nitrite, strontium nitrite and barium nitrite.

The N-nitroso-hydroxylamine derivative used in the process of the invention as an inhibitor may be expressed by the following general formula:

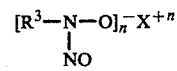

wherein, $R^3$ is a hydrocarbon radical selected from the group consisting of an alkyl, alkenyl, cycloalkyl, aryl and aralkyl radical having up to 18 carbon atoms or said hydrocarbon radical substituted by a halogen atom, a hydroxyl or cyano group; X is a hydrogen atom, a metal of Group I to III or VIII of the Periodic Table or an ammonium group which may be substituted by said alkyl or cycloalkyl radical; and n is an integer representing valence (electric charge). For example, the hydrocarbon radical is methyl, ethyl, n-propyl, isopropyl, n-butyl, hexyl, octyl, nonyl, decyl, dodecyl, tetradecyl, cyclohexyl, phenyl, tolyl, xylyl or naphthyl; the halogen atom is chlorine or bromine; the substituted hydrocarbon radical is chloromethyl; the metal is sodium, potassium, magnesium, calcium, strontium, barium, aluminum, copper, zinc, cerium, iron, nickel or cobalt.

Typical examples are the ammonium salt of N-nitrosophenylhydroxylamine, aluminum salt of N-nitroso-phenylhydroxylamine, iron salt of N-nitrosophenylhydroxylamine, cyclohexylammonium salt of N-nitroso-cyclohexyl hydroxylamine and cerium salt of N-nitroso-cyclohexyl hydroxylamine.

In the practice of the process of the invention, the metal nitrite and N-nitroso-hydroxylamine derivative may be used alone or in any combination.

The weight of the inhibitor is 0.001 to 0.5% by weight, preferably 0.003 to 0.4% by weight, most preferably 0.005 to 0.3% by weight, based on total amounts of the reactants. Amounts of inhibitor less than 0.001% by weight tends to produce a gel. On the other hand, an amount of inhibitor greater than 0.5% by weight is uneconomical and causes deterioration of the physical properties of the cured oligomer.

In the practice of the invention, the reaction may be carried out in the absence or in the presence of a catalyst. If a catalyst is employed, it is preferable to select a catalyst compatible with the nature of the reactants employed. For example, for the reaction of a diglycidyl unsaturated alicyclic dicarboxylate with an acrylic acid, the catalyst may be a tertiary amine, a Lewis acid or a quaternary ammonium salt. In such a case, the weight of the catalyst should be at most 5.0% by weight based on the total amount of the reactants to avoid the procedure of removing the catalyst from the product. The use of a larger amount of the catalyst, even if it does not necessitate removal of the catalyst, may adversely effect the physical properties of the cured material.

The temperature at which the reaction is carried out will vary with the kinds and proportions of the reactants, catalysts and inhibitors used and other reaction conditions, as well as according to whether or not the catalysts are employed. However, the reaction temperature is generally selected in the range between room temperature and 200° C., or preferably 50° C. and 150° C. If a lower reaction temperature than room temperature is employed, the reaction will proceed slowly, taking an undue length of time to provide a desired product. Conversely, if a reaction temperature higher than 200° C. is employed, then gelation often takes place by thermal polymerization.

Though the reaction may be accomplished without a solvent, it is possible to add, if necessary, an inert organic solvent such as benzene, toluene, xylene or chloroform. The proportion of the solvent is generally at most 10 parts by volume per part of the total amounts of the reactants. However, a larger proportion of solvent may be used when the viscosity of the oligomer obtained is relatively high.

The degree to which the above reaction has proceeded toward completion may be determined by measuring the acid number of a suitable reactant.

The oligomer obtained by the process of the invention can be used alone or as a solution dissolved in the inert organic solvent used in the above-mentioned reaction without gel.

The resulting product oligomer may be used in combination with a monomer which is copolymerizable with the acryloyl group, when it is not possible to use the inert solvent to dissolve the product in a desired application. It is preferable to use a monomer which is a liquid at ambient temperature. Examples of the monomer are styrene, acrylonitrile, methacrylonitrile, vinyltoluene, acrylate such as methylacrylate, butylacrylate, cyclohexylacrylate, 2-hydroxyethylacrylate, 2-hydroxypropylacrylate, 2-hydroxy-3-chloromethyl acrylate, N,N-dimethylaminoethylacrylate, 2-hydroxy-3-phenoxypropylacrylate, ethyleneglycol diacrylate, hexanediol diacrylate, trimethylolpropane triacrylate, tetramethylolmethane triacrylate, tetramethylolmethane tetracrylate, or neopentylglycol diacrylate; divinyl benzene, vinyl pyridine, vinyl acetate and diallyl phthalate.

Where the oligomer is dissolved in a solvent or a monomer, the proportion of the solvent or monomer to it varies with its viscosity and the desired application. Generally, the proportion is preferably selected in a range recognized as a conventional amount in this art.

The oligomer, dissolved in a solvent or a monomer, can easily be cured by ultraviolet radiation, an electron beam or heating after being coated on a substrate. The resulting material can be employed for shapings, laminatings, coatings, adhesives and the like.

When the curable compound above-described is cured by ultraviolet radiation, it is possible to shorten the curing time of the compound by adding a photosensitizer such as benzoin, benzoin methyl ether, benzoin ethyl ether, benzoin isopropyl ether, benzil (dibenzoyl), diphenyl disulfide, tetramethyl thiuram monosulfide, diacetyl, azobisisobutyronitrile, 2-methyl-anthraquinone, 2-ethyl-anthraquinone and 2-tertbutyl-anthraquinone, to the oligomer or its solution. The proportion of the photosensitizer is at most 5% by weight based on the weight of the curable compound.

Furthermore, it is possible to readily cure the curable compound by heating it in the presence of a free radical polymerization initiator, such as an organic peroxide. The proportion of the free radical initiator is at most 5% by weight based on the weight of the curable compound.

To coat the curable compound, conventional coating methods employing a roll coater, barcoater, curtain flow coater and employing a brush and sprayer can be used. Further, used as an adhesive, the curable compound may be sprayed or coated on the surface of the substrate, or the substrate may be immersed in the curable compound.

The substrates to be coated or adhered include shaped articles formed from a metal such as an aluminum, copper, chromium, iron, lead, zinc, tin, nickel, nobel metals and their alloys (for example, brass, bronze and stainless steel); a cellulose such as a wood, paper and cotton; a synthetic resin such as a polyethylene, polypropylene, polystyrene, polyvinylchloride, polyacrylonitrile, acrylonitrile-styrene copolymer, acrylonitrile butadiene-styrene terpolymer, polyamide, unsaturated polyester, phenolic resin, melamine resin, urea resin and their blends; a rubber such as a polybutadiene, styrene-butadiene copolymer, ethylene-propylene-copolymer, ethylene-propylenediene terpolymer, polychloroprene, acrylonitrile-butadiene copolymer, chlorinated polyethylene and natural rubber; and an inorganic compound such as a glass, gypsum and cement. The shaped articles can be formed into a powder, film, sheet, plate, pipe, rod, sphere, fiber, cloth and the like.

This invention will be more fully understood by reference to the following examples which illustrate a preferred embodiment of the invention.

Throughout the examples and comparative examples, adhesion was determined by the cross-cut-cellophane tape test. This test was conducted as follows: the coating was cut into 100 square pieces of 1 mm width to form a checkerboard pattern by a razor and a commercially available 12 mm width adhesive cellophane tape was pasted on the surface of the checkered coating. The cellophane tape was pressed against the checkered coating by five strong strokes with a nail. One end of the tape was quickly stripped from the coating and the number of the checkered pieces of the coating adhering to the tape was measured. The pencil hardness of the surface of the coating was determined according to the test method specified in the Japanese Industrial Standards (JIS) K-5401 on a pencil scratch tester (manufactured by DAIYŪ KIZAI CO., LTD.) with pencils bearing the trade name "Mitsubishi Uni" used for the test. The structure of the oligomer was presumedly determined by gel permeation chromatography (hereinafter referred as GPC).

EXAMPLE 1

The following ingredients were added to a 1-liter four necked flask fitted with a stirrer, thermometer, nitrogen inlet and condenser: (a) 364 grams (g) of the epoxide resin of diglycidyl methyltetrahydrophthalate having an epoxide equivalent weight of 182 (manufactured by Showa Denko K.K. under the trade name "SHODYNE 531"), (b) 144g (2.0 moles) of acrylic acid, (c) 1.0g of N,N-diethylcyclohexylamine and (d) 1.53g of the ammonium salt of N-nitroso-phenylhydroxylamine (0.3% by weight based on reactants, hereinafter referred to as "cupferron"). Under an atmosphere of nitrogen, the mixture was held at a temperature between 100° C. to 118° C. with stirring for one hour. A pale orange viscous reaction product was obtained and its conversion was 84.1% based on measurement of acid value. The reaction product was soluble in ethyl alcohol, acetone, benzene and toluene. Its gel permeation chromatogram in a 1% by weight chloroform solution of the reaction product showed that the obtained diacrylate corresponded in its distribution to the epoxide resin used as a starting material.

The homogeneous solution of curable compound obtained by mixing 80g of the aforesaid reaction product, 20g of ethyl alcohol and 2g of 2-ethyl anthraquinone was uniformly coated on an untreated tin plate to a thickness of about 10 microns by using a barcoater. Thereafter, the coated plate was placed 35 cm from a high pressure mercury lamp rated at 4 KW (30 W/cm) with 500 W/m$^2$ (365 m$\mu$) intensity and was irradiated for 3 seconds. The coated curable compound was completely cured and was tack-free in air.

Further, the photo-cured compound was heated in an oven for 3 minutes at 180° C. The cured compound obtained measured 3H on a pencil scratch tester and 100/100 on the cross-cut-cellophane tape test (showed no peeling).

To 70g of the aforesaid reaction product were added 30g of 2-hydroxypropyl methacrylate and 1g of cobalt naphthenate (5% by weight as cobalt in naphthenic acid), followed by stirring to give a homogeneous solution. The solution was uniformily coated on a polyester film of 25 microns in thickness to a thickness of about 20 microns by using a barcoater. The coated compound was cured by heating for 30 minutes at 120° C. to 130° C. The coated compound was completely cured tack-free in air in spite of the absence of an organic peroxide catalyst.

COMPARATIVE EXAMPLE 1

Reaction was carried out in substantially the same manner as in Example 1 except 1.22g of hydroquinone (0.24% by weight based on reactants) was used instead of the cupferron used in Example 1. A white, rubbery material was precipitated at a reaction temperature of about 60° C. The desired product could not be obtained. The conversion of reactants based on measuring the acid function was only 8.4%. The white rubbery precipitate was insoluble in the organic solvent mentioned above.

EXAMPLE 2

The same type of 1-liter four necked flask as used in Example 1 was charged with (a) 338g of glycidyl ester resin of diglycidyl methyltetrahydrophthalate having an epoxide equivalent weight of 169 (manufactured by Showa Denko K.K. under the trade name "SHODYNE 531"), (b) 72g (1.0 mole) of acrylic acid and (c) 0.16g of cupferron (0.039% by weight). Under an atmosphere of nitrogen, the reaction was conducted for 50 minutes at a temperature between 100° C. and 121.5° C. with full stirring. At the completion of the reaction, a faintly orange viscous liquid (reaction product) was obtained. The conversion of acid function was 99%. The reaction product is referred to as "the reaction product (D)".

COMPARATIVE EXAMPLE 2

The same type of 1-liter four necked flask as used in Example 1 was charged with (a) 169g of diglycidyl methyltetrahydrophthalate used in Example 1, (b) 64.85g (0.9 mole) of acrylic acid, (c) 0.52g of N,N-diethylcyclohexylamine and (d) 1.17g of phenothiazine (0.5% by weight). Under an atmosphere of nitrogen the mixture was heated with stirring. A white, rubbery precipitate began to form when the reaction temperature reached 70° C. The precipitate increased as the temperature rose according to heat of the reaction. Precipitation occurred even where heating was stopped at 90° C. and the reaction mixture was allowed to stand to cool. The reaction was finally stopped by ice cooling the outer parts of the flask at 114° C. The precipitate formed was insoluble to the organic solvent mentioned above. The desired product could not be obtained.

COMPARATIVE EXAMPLE 3

Reaction was attempted at 100° C. to 120° C. in substantially the same manner as in Example 2 except that 0.90g of hydroquinone (0.22% by weight) was used instead of cupferron. Gelation took place 15 minutes after the reaction temperature reached to 100° C.

COMPARATIVE EXAMPLE 4

Reaction was attempted in substantially the same manner as in Comparative Example 3 except that room temperature was used as the reaction temperature. A jellied product was obtained after one week. Conversion as measured by acid function was only 22.7%.

EXAMPLE 3

Into a 3-liter four necked flask fitted with a stirrer, thermometer, nitrogen inlet and condenser were charged (a) 1000g (8.62 moles) of 2-hydroxyethylacrylate, (b) 1431g (8.62 moles) of methyltetrahydrophthalic anhydride, (c) 9.26g of N,N-diethylcyclohexylamine and (d) 1.22g of cupferron. Thereafter, the reaction mixture was heated for 5 hours at 60° C. to 82.5° C. with stirring under an atmosphere of nitrogen. A half ester was obtained as a faintly yellow viscous liquid. Hereinafter the half ester is referred to as "reaction product (E)".

Next, (i) 282g of the reaction product (E), (ii) 184g of glycidyl ester resin of diglycidyl methyltetrahydrophthalate an epoxide equivalent weight of 184 (abovementioned SHODYNE 531), (iii) 1.55g of N,N-diethylcyclohexylamine and 0.2g of the aluminum salt of N-nitroso-phenyl hydroxylamine (0.04% by weight) were added into the same type of four necked flask as used in Example 1. Thereafter the mixture was heated for 90 minutes at 100° C. to 120° C. with stirring under an atmosphere of nitrogen. At completion of the reaction, a faintly orange viscous liquid was obtained. The conversion of acid function was 82%.

COMPARATIVE EXAMPLE 5

Into the same type of four necked flask as used in Example 1 were added (a) 144g (1.0 mole) of 2-hydroxypropylmethacrylate, (b) 166g (1.0 mole) of methyltetrahydrophthalic anhydride, (c) 1.6g of N,N-diethylcyclohexylamine, (d) 260g (2.5 moles) of styrene and (e) 2.34g of p-benzoquinone. Thereafter, a half ester was prepared in accordance with the procedure of Example 3. Further, to this mixture was added 210g of glycidyl ester resin of diglycidyl phthalate type epoxy resin having an epoxide equivalent weight of 210 (manufactured by Showa Denko K.K. under the trade name "SHODYNE 509"). Next, the reaction mixture was then heated to 100° C. to 120° C. under an atmosphere of nitrogen. Gelation took place after one hour. The conversion based on acid function was 27%.

EXAMPLE 4

Initially, (a) 282g of the reaction product (E), (b) 160g hexamethyleneglycol diglycidyl ether type epoxy resin having an epoxide equivalent weight of 160 (manufactured by Kyoeisha Yushi K.K. under the trade name "Epolite 1600"), (c) 1.55g of N,N-diethylcyclohexylamine and (d) 0.2g of sodium salt of N-nitroso-phenyl hydroxylamine (0.045% by weight) were charged to the same type of four necked flask as used in Example 1. Thereafter, the reaction was carried out for 3 hours at 100° C. to 120° C. with stirring under an atmosphere of nitrogen. A faintly orange viscous liquid (reaction product) was obtained. The conversion of acid function was 86%.

A coating compound was prepared by mixing 0.5g of dicumyl peroxide with 80g of this reaction product. The catalyst and compound were coated on an aluminum plate of 1 mm thickness, whose surface was previously treated with trichloroethylene. The thickness of the coat was 20 microns. A barcoater was used for coating. The aluminum plate was laid with its coated surface on a film of polyethylene having 0.2 mm thickness (manufactured by Showa Yuka K.K. under the trade name "SHOLEX F-131", density of 0.922g/cc, melt index of 5.1g/10 minutes at 2.16 Kg of load and 190° C.). Next, the coated plate and film were compressed for 5 minutes at 160° C. under a load of 10 Kg/cm$^2$ using a heat press.

The compressed plate obtained had a peeling strength of 12.8g/2.5 cm.

EXAMPLE 5

The same type of four necked flask as used in Example 1 was charged with (a) 282g of the reaction product (E), (b) 185g of bisphenol A diglycidylether type epoxy resin having an epoxide equivalent weight of 185 (manufactured by Showa Denko K.K. under the trade name "SHODYNE 428"), (c) 2.0g of tri-n-butylamine and (d) 0.1g of iron salt of N-nitroso-phenyl hydroxylamine (0.021% by weight). Thereafter, the mixture was heated for 2 hours at 100° C. to 122° C. with stirring under an atmosphere of nitrogen. A faintly orange viscous liquid was obtained. The conversion based on acid function was 78%.

EXAMPLE 6

The same type of four necked flask as used in Example 1 was charged with (a) 282g of the reaction product (E), (b) 145g of diglycidyl hexahydrophthalate type epoxy resin having an epoxide equivalent weight of 145 (manufactured by Showa Denko K.K. under the trade name "SHODYNE 540"), (c) 2.0g of tri-n-butylamine and (d) 0.16g of the cupferron (0.037% by weight). Thereafter, the mixture was heated for 2 hours at 100° C. to 120° C. with stirring under an atmosphere of nitrogen. The reaction product was a light orange viscous liquid. The conversion based on acid function was 86%.

It was shown by a gel permeation chromatogram in a 1% by weight chloroform solution of the reaction product, that the obtained diacrylate corresponded in its distribution to the diglycidyl hexahydrophthalate type epoxide resin used as a starting material.

The reaction product (70g) was thinned with 30g of 2-hydroxypropyl methacrylate and 2g of 2-ethylanthraquinone. The coating compound was coated on a steel plate (JIS G3141) whose surface was previously treated with methylethylketone to a thickness of about 10 microns by using a barcoater. The coated plate was irradiated for 12 seconds by two 1 KW (30 W/cm) high pressure mercury lamps which were placed at a distance of 15 cm from the plate. The coated compound was completely cured and the cure was tack-free in air. The cured compound obtained measured 2H on the pencil scratch tester and 100/100 on the cross-cut-cellophane tape test. Also, the cured compound was capable of withstanding boiling water for 1 hour without film failure, blistering, lifting or turning milky.

EXAMPLE 7

Into the same type of four necked flask as used in Example 1 were added (a) 97g (0.5 mole) of tetraethylene glycol, (b) 166g (1.0 mole) of methyltetrahydrophthalic acid anhydride and (c) 3.1g of N, N-diethylcyclohexylamine. Thereafter, a half ester containing a terminal dicarboxyl group was obtained by heating for 5 hours at 60° C. to 80° C. with stirring under an atmosphere of nitrogen. 65.75g of the ester obtained and 102.5g of the reaction product (D) were heated for 90 minutes at 100° C. to 119° C. with stirring in an atmosphere of nitrogen. As a result, a faintly orange viscous liquid was produced. The conversion based on acid function was 65.2%.

EXAMPLE 8

Into the same type of four necked flask as used in Example 1 were added (i) 282g of the reaction product (E), (ii) 114g (1.0 mole) of allyl glycidylether, (iii) 1.55g of N, N-diethylcyclohexylamine and (iv) 0.16g of cupferron (0.040% by weight). The mixture was heated to 100° C. to 126° C. with stirring in an atmosphere of nitrogen and the reaction carried out for 4 hours, thereby providing a faintly orange viscous liquid product. The conversion based on acid function was 86.6%.

COMPARATIVE EXAMPLE 6

Reaction was attempted in substantially the same manner as in Example 8 except that 0.16g of p-methoxyphenol (0.040% by weight) was used instead of the cupferron. Gelation took place 30 minutes after the temperature was raised to 100° C.

EXAMPLE 9

Into the same type of four necked flask as used in Example 1 were added (a) 130g (0.9 mole) of 2-hydroxypropylmethacrylate, (b) 1.66g (1.0 mole) of nadic anhydride,* (c) 1.3g of tri-butylamine and (d) 0.1g of copper salt of N-nitrosophenylhydroxylamine. A half ester was obtained by heating for 5 hours at 80° C. to 100° C. with stirring under an atmosphere of nitrogen. To the half ester was added 280g of polyethylene glycol diglycidylether type epoxy resin having an epoxide weight of 280 (manufactured by Showa Denko under the trade name "SHODYNE 810"). Thereafter, the reaction was carried out for 4 hours at 100° C. to 125° C. with full stirring in an atmosphere of nitrogen. As a result, a faintly orange viscous liquid was obtained. The conversion was 83%.

*NADIC ANHYDRIDE, trademark for 3,6-endomethylene-1,2,3,6-tetrahydro-cis-phthalic anhydride.

EXAMPLE 10

Into the same type of four necked flask as used in Example 1 were added (a) 144g (2.0 moles) of acrylic acid, (b) 6.2g of N, N-diethylcyclohexylamine and (c) 0.05g of p-benzoquinone. The mixture was heated to 100° C. Then 300g (2.0 moles) of phenyl glycidyl ether was added dropwise to the reaction mixture in the flask for 40 minutes with stirring while maintaining a temperature from 100° C. to 120° C.

After the addition of glycidyl ether was completed the heating was continued for 40 minutes at the above level. The conversion based on acid function was 97.4%.

(i) 222g of the reaction product obtained, (ii) 166g (1.0 mole) of methyltetrahydrophthalic anhydride, (iii) 410g of the reaction product (E), (iv) 1.55g of N, N-diethylcyclohexylamine and (v) 0.2g of cupferron (0.025% by weight) were added to the flask. While this mixture was heated to 100° C. to 188° C. with stirring under an atmosphere of nitrogen, reaction was carried out for 2 hours, providing a faintly orange viscous liquid product. The conversion based on acid function was 79.4%.

EXAMPLE 11

A 2-liter four necked flask fitted with a stirrer, thermometer, nitrogen inlet and condenser was charged with (a) 20.0g of methyl methacrylate, (b) 70.0g of styrene, (c) 20.0g of n-butyl acrylate, (d) 26.9g of glycidyl methacrylate, (e) 2.0g of azobisisobutyronitrile, (f) 3.0g of dodecyl mercaptan and (g) 1000g of toluene. Thereafter, reaction was carried out for 1 hour at 100° C. As a result, 103.1g of polymer was obtained. The average molecular weight of the polymer was 8000 determined by measurement of osmotic pressure.

Then, 100g of the polymer was dissolved in 500g of styrene. Next, to that solution was added 50.0g of the reaction product (E), 5.0g of N, N-dimethyl aminoethyl methacrylate and 0.1g of cupferron (0.035% by weight). The mixture was then heated from 90° C. to 100° C. for 2 hours with stirring under an atmosphere of nitrogen. It was found that 93% of the glycidyl groups in the polymer were converted to ester groups according to a ring-opening reaction. As a result, a polymerizable composition in which acryloyl groups were pendant to the side chain of the polymer was obtained.

EXAMPLE 12

Into a 500 ml four necked flask fitted with a stirrer, thermometer, nitrogen inlet and condenser were added (a) 284g (2.0 moles) of glycidyl methacrylate, (b) 184g (1.0 mole) of methyltetrahydrophthalic acid, (c) 1.2g of N, N-diethylcyclohexylamine and (d) 0.47g of cupferron (0.1% by weight). Thereafter, the mixture was heated from 100° C. to 119° C. for 90 minutes with stirring under an atmosphere of nitrogen. The mixture was a heterogeneous system at an initial period when the dicarboxylic acid was suspended, however, it became a homogeneous system as the reaction proceeded. At the completion of the reaction an orange viscous liquid product was obtained. The conversion based on acid value was 92.3%.

To a homogeneous mixture of 30g of 2-hydroxyethylacrylate and 70g of the reaction product was added 1.0g of benzoin ethylether and 1.0g of 2-ethylanthraquinone to yield a coating compound. The coating compound thus obtained was coated on an untreated aluminum plate to a thickness of about 10 microns using a barcoater. The coated film was irradiated for 12 seconds in air by two 1 KW high pressure mercury lamps (30 W/cm) which were placed at a distance of 15 cm from the panel. The panel was completely cured and the cured film was tack-free. The cured compound obtained measured 2H on the pencil scratch test and 100/100 on the cross-cut-cellophane tape test. Also, when the cured compound was boiled in water for 1 hour, no film failure, blistering, lifting or milkiness occurred.

EXAMPLE 13

Into the same type of four necked flask as used in Example 1 were charged (a) 300.4g of diglycidyl methyltetrahydrophthalate type epoxy resin having an epoxide equivalent weight of 169 (manufactured by Showa Denko K.K. under the trade name "SHODYNE 531"), (b) 127.6g (1.77 moles) of acrylic acid, (c) 0.8g of N, N-diethylcyclohexylamine and (d) 0.86g of sodium nitrite (0.2% by weight). Under an atmosphere of nitrogen the charged mass was heated for 110 minutes at 90° C. to 150° C. with stirring. As a result, a reddish orange viscous liquid product was obtained. The conversion based on acid function was 92.7%.

EXAMPLE 14

Into the same type of four necked flask as used in Example 1 were added 180g (2.0 moles) of 1,4-butanediol and 499.2g (3.07 moles) of methyltetrahydrophthalic anhydride. Thereafter, the mixture was heated for 6 hours from 130° C. to 190° C. under an atmosphere of nitrogen. As a result, 10.9g of water was removed and a polyester having an acid value of 171.0 was obtained.

Next, (a) 215.7g of the polyester, (b) 270.0g of the reaction product (D) and (c) 0.3g of cupferron (0.062% by weight) were added into the same type of four necked flask as used in Example 1. Then the mixture was heated for 90 minutes at 100° C. to 110° C. under an atmosphere of nitrogen. As a result, a faintly orange viscous liquid product was obtained. The acid value of the mixture was 75.9 prior to reaction. The acid value of reaction product decreased to 25.0. The conversion based on acid function was 67.0%.

A coating compound was prepared by mixing 40.0g of 2-hydroxypropyl methacrylate, 2.0g 2-ethylanthraquinone and 60.0g of the faintly orange reaction product. The coating compound was uniformly coated on an untreated tin plate to a thickness of 10 microns by using a barcoater. The coated film was irradiated for 5 seconds by the above-mentioned mercury lamp which was placed at the distance of 35 cm from the panel. The coated compound was completely cured tack-free in air. The cured compound obtained measured H on the pencil scratch tester and 95/100 on the cross-cut-cellophane tape test.

COMPARATIVE EXAMPLE 7

Into the same type of four necked flask as used in Example 1 were added (a) 121.0g of glycidyl hexahydrophthalate type epoxy resin having an epoxide equivalent weight of 150 (manufactured by Showa Denko K.K. under the trade name "SHODYNE 540"), (b) 49.0g (0.68 mole) of acrylic acid and (c) 0.08g of hydroquinone (0.04% by weight). Then the mixture was heated for 80 minutes at 100° C. to 130° C. under an atmosphere of nitrogen. At the completion of the reaction, a faintly yellow viscous liquid product was obtained. The conversion based on acid function was 96%. Since the glycidyl phthalate employed is a saturated alicyclic compound and does not contain an unsaturated alicyclic nucleus, the reaction proceeds smoothly in the presence of the hydroquinone, and gelation does not take place.

A coating compound was prepared by mixing 7g of the yellow reaction product, 3g of 2-hydroxy propyl methacrylate and 1g of cobalt naphthenate (5% solution). The coating compound was uniformly coated in the same manner as in Example 1 on a polyester film to a thickness of about 20 microns. The coated compound was heated for about 30 minutes at 120° C. to 130° C. in an attempt to cure the compound. However, the coated compound was not cured and its surface was tacky.

EXAMPLE 15

Into the same type of 1-liter four necked flask as used in Example 1, were added (a) 270g of 3,4-epoxycyclohexylmethyl-3,4-epoxycyclohexane carboxylate (manufactured by Chisso K.K. under the trade name "Chissonox 221"), (b) 564g of the reaction product (E), (c) 3g of N, N-diethylcyclohexylamine and (d) 0.4g of calcium nitrite (0.05% by weight). Under an atmosphere of nitrogen, the reaction was conducted for 1.5 hours at 100° C. to 125° C. with stirring. At the completion of the reaction, a faintly orange viscous reaction product was obtained. The conversion based on acid function was 85%.

70g of the reaction product was thinned with 30g of 2-hydroxyethylacrylate and 2g of 2-ethylanthraquinone to prepare a coating compound. The coating compound was coated on a flame-treated film of polyethylene of 0.2 mm thickness (manufactured by Showa Yuka K.K. under the trade name "SHOLEX F131", density of 0.922 g/cc) to a thickness of about 10 microns by using a barcoater. The coated film was irradiated for 15 seconds under the same lamp used in Example 6. The coated compound was completely cured tack-free in air and measured 100/100 on the cross-cut-cellophane tape test.

EXAMPLE 16

(a) 282g of the reaction product (E), (b) 155g of 1,3-diglycidyl-5,5-dimethylhydantoin having an epoxide equivalent weight of 155 (manufactured by Kyoeisha Yushi K.K. under the trade name "Epolite N-255"), (c) 1.5g of N, N-diethylcyclohexylamine and 0.2g of cupferron (0.045% by weight) were reacted as in Example 4. After one hour, a faintly reddish brown viscous reaction product was obtained with 80% conversion based on acid function.

EXAMPLE 17

(a) 282g of reaction product (E), (b) 185g of diglycidyl ether of bisphenol F having an epoxide equivalent weight of 185, (c) 1.5g of N, N-diethylcyclohexylamine and (d) 0.2g of cupferron (0.043% by weight) were reacted as in Example 4. After two hours, a faintly orange viscous liquid was obtained. The conversion based on acid function was 75%.

While in the foregoing specification various embodiments of the invention have been set forth for the purpose of illustration, it will be apparent to those skilled in the art that other modifications can be made without departing from the basic concept and spirit of the invention.

We claim:

1. In the process for preparing a polymerizable (meth) acrylate oligomer susceptible to gelation, the improvement comprising employing a metal nitrite to inhibit gelation during the oligomer-forming reaction between:
    (A) a glycidyl-(meth) acrylate and an unsaturated alicyclic dicarboxylic acid or anhydride thereof;
    (B) a diglycidyl unsaturated alicyclic dicarboxylate and acrylic acid; or
    (C) an epoxide and a half ester, said half ester formed by reacting an unsaturated alicyclic dicarboxylic acid or anhydride thereof with an acrylate having at least one hydroxyl group, said gelation inhibitor being employed in amounts from 0.001 to 0.5% by weight, based on the total weight of the reactants.

2. The process of claim 1, wherein the compounds of (A) are glycidyl acrylate and methyltetrahydrophthalic acid.

3. The process of claim 1, wherein the compounds of (B) are diglycidyl methyltetrahydrophthalate and acrylic acid.

4. The process of claim 1, wherein the compounds of (C) are diglycidyl methyltetrahydrophthalate and 2-acryloxyethyl hydrogen methyltetrahydrophthalate.

5. The process of claim 1, wherein the ring-opening reaction is carried out in the presence of N, N-diethylcyclohexylamine as a catalyst.

6. The process of claim 1, wherein the reaction temperature is 50° C. to 150° C.

7. The process of claim 1, including the step of curing the polymerizable acrylate oligomer by heating or irradiating with ultraviolet or electron beam radiation.

8. The process of claim 7, wherein the heat curing is carried out with cobalt naphthenate as a catalyst.

9. The process of claim 7, wherein the ultraviolet curing is carried out employing 2-ethylanthraquinone as a photosensitizer.

10. The process of claim 1, wherein the epoxide of (C) is diglycidyl ether of bisphenol A.

11. The process of claim 1, wherein the epoxide of (C) is diglycidyl ether of bisphenol F.

* * * * *